United States Patent
Nomura et al.

(10) Patent No.: US 7,545,408 B2
(45) Date of Patent: Jun. 9, 2009

(54) IMAGE PICKUP APPARATUS AND IMAGE PICKUP METHOD

(75) Inventors: Hirofumi Nomura, Saitama (JP); Makibi Nakamura, Tokyo (JP)

(73) Assignee: Sony Corporation (JP)

( * ) Notice: Subject to any disclaimer, the term of this patent is extended or adjusted under 35 U.S.C. 154(b) by 954 days.

(21) Appl. No.: 10/879,435

(22) Filed: Jun. 29, 2004

(65) Prior Publication Data
US 2005/0030385 A1    Feb. 10, 2005

(30) Foreign Application Priority Data
Jul. 15, 2003    (JP)    ............... P2003-274613

(51) Int. Cl.
*H04N 5/228*    (2006.01)

(52) U.S. Cl. ............... 348/208.1; 348/208.4; 348/208.5

(58) Field of Classification Search ............ 348/208.99, 348/208.12, 208.2, 205.6, 208.14, 208.3, 348/208.1, 208.4, 208.5, 208.6
See application file for complete search history.

(56) References Cited

U.S. PATENT DOCUMENTS

| | | | | |
|---|---|---|---|---|
| 4,490,744 A | * | 12/1984 | Levine | ............... 348/249 |
| 4,907,287 A | * | 3/1990 | Homma et al. | ............... 382/255 |
| 5,210,559 A | * | 5/1993 | Ohki | ............... 396/55 |
| 5,296,925 A | * | 3/1994 | Kondo et al. | ............... 348/208.1 |
| 5,416,557 A | * | 5/1995 | Nagasaki et al. | ............... 396/52 |
| 5,712,474 A | * | 1/1998 | Naneda | ............... 250/208.1 |
| 6,906,746 B2 | * | 6/2005 | Hijishiri et al. | ............... 348/240.2 |

FOREIGN PATENT DOCUMENTS

| | | |
|---|---|---|
| JP | 11-317904 | 11/1999 |
| JP | 2000-341577 | 12/2000 |
| JP | 2001-285698 | 10/2001 |

* cited by examiner

*Primary Examiner*—Lin Ye
*Assistant Examiner*—Euel K Cowan
(74) *Attorney, Agent, or Firm*—Lerner, David, Littenberg, Krumholz & Mentlik, LLP

(57) ABSTRACT

The present invention provides an image pick up apparatus having means for cumulatively adding image signals and storing the image signals in memory, which is capable of preventing cumulative addition of image signals for which camera-shake correction is insufficient and improving picture quality of image signals stored in memory.

4 Claims, 5 Drawing Sheets

INTEGRATOR

:POSSIBLE IMAGE REGION

:ACTUAL IMAGE REGION

IMAGE PICKUP APPARATUS AND IMAGE PICKUP METHOD

BACKGROUND OF THE INVENTION

1. Field of the Invention

This invention relates to an image pickup apparatus and method, and more particularly, an image pickup apparatus and method for preventing cumulative addition of image signals for which camera-shake correction is insufficient, and for improving picture quality of image signals stored in memory.

2. Description of the Related Art

Various forms of camera-shake prevention technologies for preventing blurring of images resulting from vibration due to movement of a camera operator and preventing degrading (blurring, dislocating) of recording images have been proposed for image pickup apparatus such as digital still cameras and video cameras capable of taking and recording images in the related art.

For example, an image pickup apparatus that detects an amount of dislocation in the event of taking a picture from an image (still image) captured over a prescribed period or prescribed number of times and then records images (still images) for which the dislocation amount is the smallest has been proposed, and described in, for example, Japanese Patent Application Publication No. Hei. 11-317904 (at page 11-12, FIG. 1, FIG. 26).

However, as shown in FIG. 7A, it is preferable for image pickup apparatus that cumulatively add picked up image signals for storage in memory to ensure a sufficient maximum value (herein after referred as maximum correction amount) for the correction amount in order to correct camera-shake completely so as to enable cumulative addition. However, in reality, as shown in FIG. 7B, cumulative addition only achieves camera-shake correction up to the maximum correction value for image signals which exceed the maximum correction amount, and blurred and overlapping (dislocated) images are therefore stored in memory.

Further, as the recording size of image signal (hereafter referred to as recording image size) is set in advance, when recording image size is set to be large against the range for which pictures can be taken by the image pickup element (hereafter referred to as possible image size), the range in which camera-shake correction is possible (hereafter referred to as correction range) becomes small, and the ends of the correction range are reached even for comparatively small camera-shake vibrations.

As an image signal corrected at the ends (hereinafter, correction ends) of the correction range is an image signal corresponding to the straight line parts of FIG. 7B, so the camera-shake correction processing is insufficient, when an image signal corrected at the correction ends in this manner is cumulatively added, images in a blurred or overlapping (dislocated) state are stored in memory.

Therefore, there is the problem to be resolved for image pickup apparatus having means for cumulatively adding image signals and storing the image signals in memory, with respect to preventing cumulative addition of image signals for which camera-shake correction is insufficient, and improving picture quality of image signals stored in memory.

SUMMARY OF THE INVENTION

In order to resolve the aforementioned problems, the image pickup apparatus of the present invention is configured in the following manner.

(1) An image pickup apparatus having means for cumulatively adding image signals picked up by an image pickup section for storage in memory, characterized by: camera-shake detection means for detecting an amount of vibration due to hand-shaking of the image pickup section and outputting a camera-shake signal according to the detected camera-shake vibration amount, camera-shake correction means for correcting the image signal photographed by the image pickup section based on a camera-shake correction amount calculated according to the camera-shake signal outputted by the camera-shake detection means, recording image size setting means for setting recording image size in the event of recording the image signal, maximum correction amount calculating means for calculating a maximum value for a camera-shake correction amount for correcting camera-shake of the image signal based on recording image size set using the recording image size setting means and a possible image size constituting a range for which imaging is possible at the image pickup element of the image pickup section, image discrimination means for comparing the camera-shake correction amount calculated by the camera-shake correction means and the maximum value for the camera-shake correction amount calculated by the maximum value correction amount calculating means and performing discrimination processing on an image signal cumulatively added to the memory, and cumulative addition control means for controlling cumulative addition processing of the image signal corrected by the camera-shake correction means in accordance with the image discrimination means.

(2) An image pickup apparatus having means for cumulatively adding image signals picked up by an image pickup section for storage in memory, characterized by: camera-shake detection means for detecting an amount of vibration due to hand-shaking of the image pickup section and outputting a camera-shake signal according to the detected camera-shake vibration amount, camera-shake correction means for correcting the image signal picked up by the image pickup section based on a camera-shake correction amount calculated according to the camera-shake signal outputted by the camera-shake detection means, recording image size setting means for setting recording image size in the event of recording the image signal, maximum correction amount calculating means for calculating a maximum value for a camera-shake correction amount for correcting camera-shake of the image signal based on recording image size set using the recording image size setting means and a possible image size constituting a range for which imaging is possible at the image pickup element of the image pickup section, image discrimination means for comparing the camera-shake correction amount calculated by the camera-shake correction means and the maximum value for the camera-shake correction amount calculated by the maximum value correction amount calculating means and performing discrimination processing on an image signal cumulatively added to the memory, cumulative addition control means for controlling cumulative addition processing of the image signal corrected by the camera-shake correction means in accordance with the image discrimination means, and image output means for multiplying a coefficient value calculated according to the number of times of cumulative addition processing by the cumulative addition control means and an image signal cumulatively added and then stored and outputted.

With an image pickup apparatus of this configuration, a maximum value for a camera-shake correction amount calculated based on recording image size set by the recording image size setting means and actual image size constituting a range where imaging is possible of the image pickup element of the image pickup section and a camera-shake correction amount calculated by the camera-shake correction means are compared, and cumulative addition processing of the image signal corrected by the camera-shake correction means is controlled. It is therefore possible to only cumulatively add and store to memory image signals appropriately corrected within the range where camera-shake correction is possible.

EFFECTS OF THE INVENTION

By comparing a maximum value (hereinafter, maximum correction value) for a camera-shake correction amount calculated based on the predetermined recording image size and possible image size constituted by the range of the image pickup element of the image pickup section for which imaging is possible and a camera-shake correction amount calculated based on camera-shake vibration amount of the image pickup section and then cumulatively adding and storing in memory only image signals corrected using camera-shake correction amounts smaller than the maximum correction amount, image signals for which correction processing is insufficient (those reaching the correction ends, image signals correction-processed using the maximum correction amounts) are not subjected to cumulative addition, and only image signals that have been appropriately corrected are cumulatively added. This means that superior results can be obtained where the picture quality (S/N ratio) of image signals stored in memory is improved.

Further, the maximum correction amount is calculated based on the predetermined recording image size. Therefore, even when with respect to the possible image size the recording image size is large, i.e. the camera-shake correction range is small, since only appropriately corrected image signals are cumulatively added, superior results that the picture quality (S/N ratio) of the image signals stored in memory is improved, can be obtained.

Moreover, the aforementioned image signal stored in memory is multiplied by a coefficient value corresponding to the number of times of cumulative addition and outputted. It is therefore possible to record image signals (still images) of superior picture quality (S/N ratio) to recording media and recording devices.

DESCRIPTION OF THE PREFERRED EMBODIMENT

The following is a description with reference to the drawings of a preferred embodiment of an image pickup apparatus of the present invention. However, the drawings are provided for the purpose of description, and in no way limit the technological scope of the present invention.

Embodiments

Figure 1:
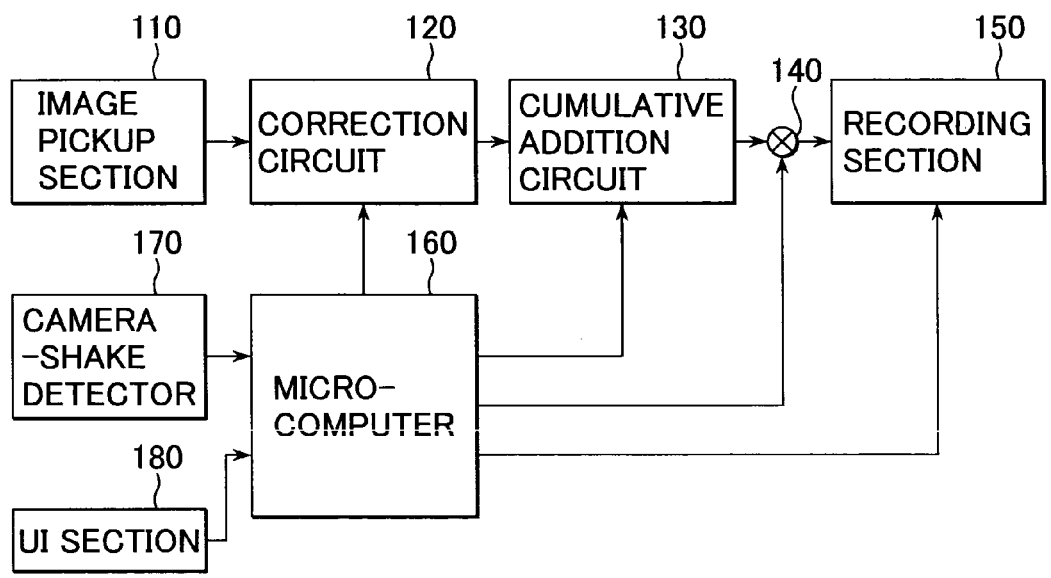
FIG. 1 is a block view showing a simplified configuration for the essential parts of the image device of the present invention.

FIG. 1 is a block view showing a simplified configuration of the essential parts of an image pickup apparatus of the present invention, comprised of an image pickup section 110, correction circuit 120, cumulative addition circuit 130, multiplier 140, recording section 150, microcomputer 160, camera-shake detector 170, and UI (user interface) 180, etc.

The image pickup section 110 is equipped with an image pickup element such as a lens and CCD (Charge Coupled Device) etc. and a signal processing circuit etc., and converts light from a subject inputted via the lens to an image signal using an image pickup element. This image signal is then subjected to prescribed signal processing at a signal processing circuit and is then sent to the correction circuit 120.

The correction circuit 120 corrects image signals transmitted from the image pickup section 110 based on correction vector data specified by the microcomputer 160 and transmits these image signals to the cumulative addition circuit 130.

Figure 2:
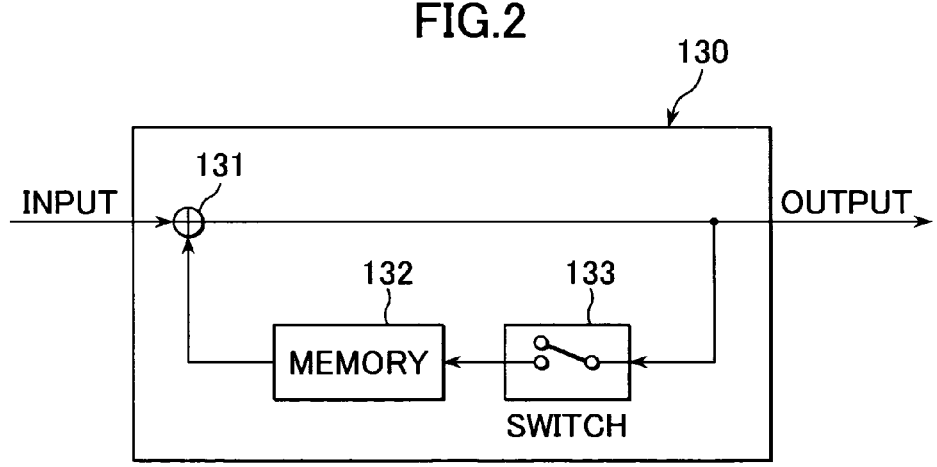
FIG. 2 is a block view showing a simplified internal configuration for the cumulative addition circuit shown in FIG. 1.

As shown in FIG. 2, the cumulative addition circuit 130 is comprised of an adder 131, memory 132, and switch 133. Image signals sent from the correction circuit 120 are then cumulatively added in the time axis direction and stored in the memory 132 every time a capture is performed under the control of the microcomputer 160.

The adder 131 of the cumulative addition circuit 130 adds and outputs the image signal outputted from the correction circuit 120 and the image signal stored in the memory 132. When the switch 133 is on, the memory 132 stores image signals outputted from the adder 131 and sends image signals to the adder 131 when image signals are inputted from the correction circuit 120. Further, the switch 133 is turned on and off according to the camera-shake signal of the camera-shake detector 170 in accordance with the control of the microcomputer 160, and the output (image signal) of the adder 131 is sent to the memory 132 when the switch 133 is on.

The multiplier 140 subjects image signals outputted from the cumulative addition circuit 130 to multiplication processing under the control of the microcomputer 160 based on coefficient values specified by the microcomputer 160 and outputs the image signals to the recording section 150.

The recording section 150 records image signals outputted from the multiplier 140 under the control of the microcomputer 160. For example, image signals are recorded on a recording medium such as a hard disc device, memory card, magnetic tape, or optical disc etc.

The microcomputer 160 controls each section within the image pickup apparatus and each circuit based on pre-stored programs and data etc.

For example, camera-shake correction amounts and correction vector data for correcting camera-shake are calculated based on a camera-shake signal detected by the camera-shake detector 170 and are sent to the correction circuit 120.

Further, a maximum value for the camera-shake correction amount (hereinafter, maximum correction amount) is calculated based on the size of the range for which photographing is possible using the image pickup element of the image pickup section 110 and the recording image size set by the UI section 180, and the cumulative addition circuit 130 is controlled based on the calculated maximum correction amount and the camera-shake correction amount.

Further, calculation of coefficient values for the multiplier 140 and transmission of these coefficient values to the multiplier 140, control of timing in the event of recording image signals to the recording section 150, etc. are carried out.

The camera-shake detector 170 detects the amount of vibration due to camera-shake of the image pickup section 110 and sends the detected vibration amount to the microcomputer 160 as a camera-shake signal. Detection of the camera-shake signal is carried out by utilizing a gyro sensor and image recognition technology etc., a value that is the integral of the amount of vibration due to the camera-shake, being detected as a camera-shake signal and sent to the microcomputer 160 every time an image signal is captured.

Figure 3:
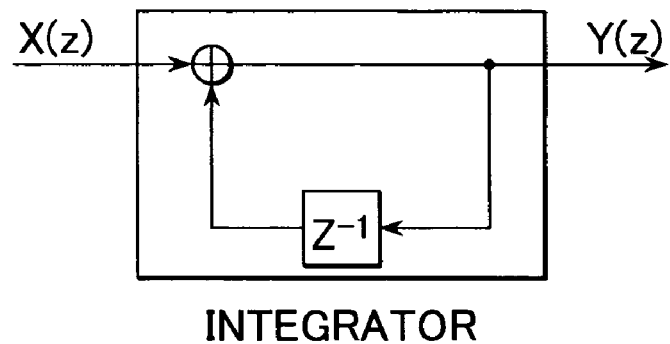
FIG. 3 is a view illustrating a method for calculating a maximum value (maximum correction amount) for a camera-shake correction amount.

For example, with the integrator expressing the complete integral shown in FIG. 3, in the case of taking input signal X(z) and output signal Y(z), the camera-shake signal can be expressed by the following equation.

$$Y(z)=1/((1-z^{-1})/X(z))$$

The UI (user interface) section 180 transmits control signals so that prescribed setting/operations are executed at the microcomputer 160 according to user operations.

Figure 4:
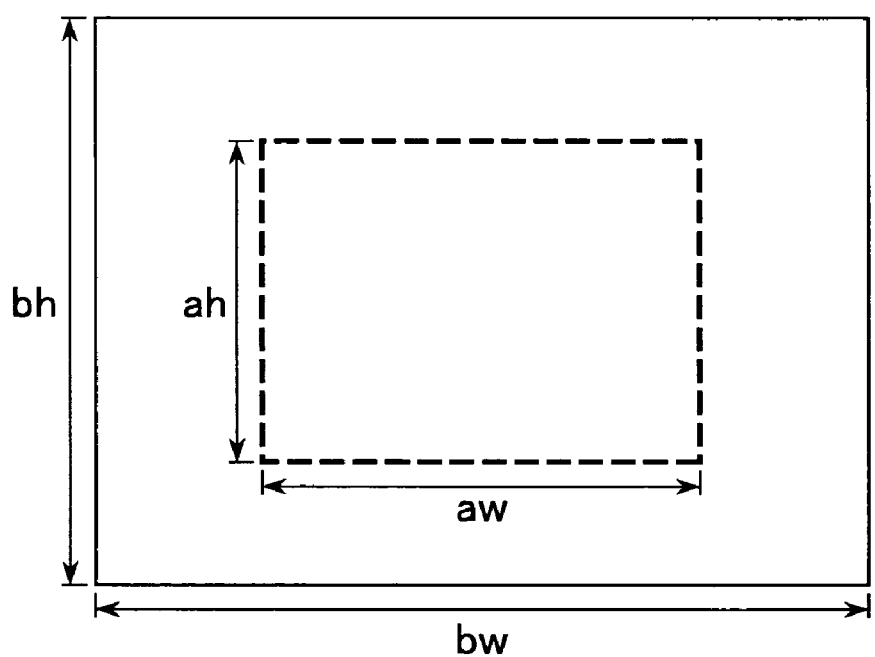
FIG. 4 is an view illustrating operation of the camera-shake detector shown in FIG. 1.
Figure 4:
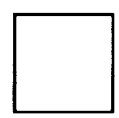
Figure 4:

A description is now given with reference to FIG. 4 of a method of calculating a maximum correction amount.

FIG. 4 shows the relationship between a possible image area (possible image size) showing the range in which photographing is possible using the image pickup element of the image pickup section 110 and an actual image area (recording image size) showing image size in the event of recording to the recording section 150.

When the length of the possible image area is taken to be bh in the vertical direction and bw in the horizontal direction, and the length of the actual image area is taken to be ah in the vertical direction and aw in the horizontal direction, for example, in a state where camera-shake correction is not carried out, the actual image area is positioned at the center of the possible image area. The maximum correction amount in this state can then be calculated using the following equation.

Correction amount in vertical direction:

$$Sw=(bh-ah)/2$$

Correction amount in horizontal direction:

$$Sw=(bw-aw)/2 \text{ where } bh \geq ah, bw \geq aw.$$

Figure 5:
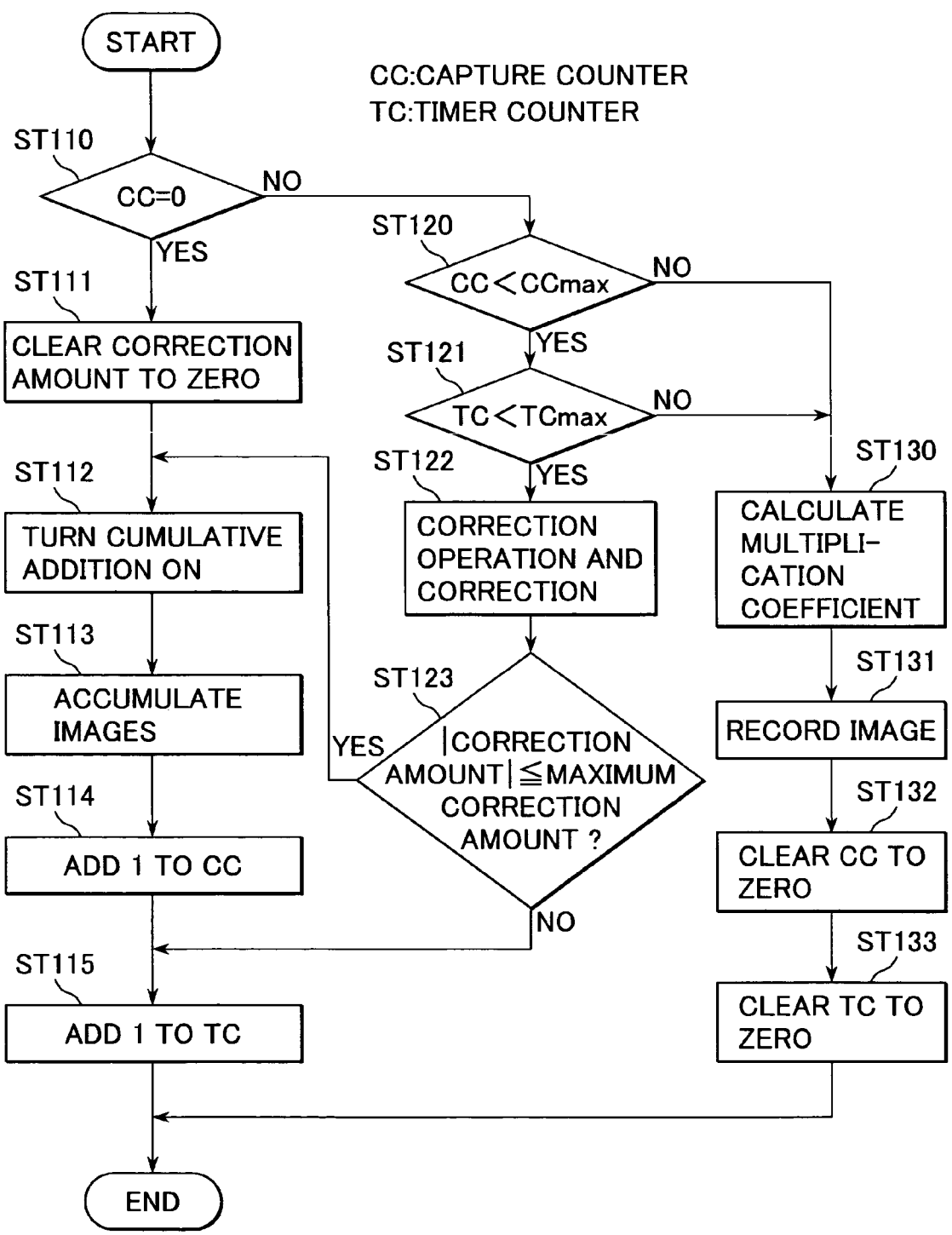
FIG. 5 is a flowchart of the operation of the image pickup apparatus shown in FIG. 1.

A description is given of the operation flow occurring at the image pickup apparatus of this configuration with reference to the flowchart of FIG. 5.

When imaging commences, first, the microcomputer 160 determines whether or not the value of a capture counter (hereinafter referred to as CC) counting the number of image signals captured (hereinafter referred to as capture number) is "0" (ST110).

When CC is "0", the microcomputer 160 clears the correction amount for the correction circuit 120 to "0" (ST111).

Switch 133 of the cumulative addition circuit 130 is then turned on, and image signals taken by the image pickup section 110 are captured, cumulatively added, and stored in the memory 132 (ST112, ST113).

As a result, the first image signal taken as a reference is stored in memory 132 of the cumulative addition circuit 130. This is to say that the correction amount for the image signal is first cleared to "0", and the maximum correction amount is not exceeded, so that an image signal is prevented from not being captured at all in cases where for image signals captured thereafter the camera-shake correction amount exceeds the maximum correction amount.

The microcomputer 160 then increases the value of CC by 1 and increases the value of the time counter (hereinafter referred to as TC) by 1, so that processing is complete (ST114,ST115→END)

On the other hand, when CC is not "0", then a captured signal is being cumulatively added at the cumulative addition circuit 130, and the microcomputer 160 then determines whether or not the value of CC is greater than or equal to the maximum value (hereinafter referred to as CCmax) of the capture number set in advance (ST110→ST120).

When the value of CC is greater than or equal to the maximum value CCmax (CC≧CCmax), processing for recording the image signal to the recording section 150 is advanced to (ST120→ST130→ . . . ).

On the other hand, in the event that the value of CC is smaller than the maximum value CCmax (CC<CCmax), the microcomputer 160 determines whether or not the value of TC is greater than or equal to a prescribed set time (hereinafter referred to as TCmax) (ST120→ST121).

When the value of TC is greater than or equal to the set time TCmax (TC≧TCmax), processing for recording the image signal to the recording section 150 is advanced to (ST121→ST130→ . . . ).

On the other hand, in the event that the value of TC is smaller than the set time TCmax (TC<TCmax), the microcomputer 160 calculates the camera-shake correction amount based on the camera-shake signal from the camera-shake detector 170 and calculates correction vector data for transmission to the correction circuit 120 based on this camera-shake correction amount. At the correction circuit 120, the image signal sent from the image pickup section 110 is corrected based on the correction vector data (ST121→ST122).

Continuing on, the microcomputer 160 compares the absolute value of the calculated camera-shake correction amount and the maximum correction amount calculated based on the image pickup element size and the recording image size set by the UI section 180 (ST122→ST123)

When the absolute value of the camera-shake correction amount is less than the maximum correction amount, the switch 133 of the cumulative addition circuit 130 is turned on, and the image signal from the correction circuit 120 is cumulatively added and stored in the memory 132 (ST123→ST112, ST113)

Next, the microcomputer 160 increases the value of CC by 1 and increases the value of the time counter (hereinafter referred to as TC) by 1, so that processing is complete (ST114, ST115→END)

On the other hand, when the absolute value of the camera-shake correction amount exceeds the maximum correction value, the value of TC is increased by 1 and processing ends (ST123→ST115→END).

Further, in step S120 above, in the event that the value of CC is greater than or equal to CCmax (CC≧CCmax), or in step S121 above, in the event that the value of TC is greater than or equal to TCmax (TC≧TCmax), processing commences to record the image signal stored in the cumulative addition circuit 130 to the recording section 150.

First, the microcomputer 160 provides the reciprocal of the value of CC to the multiplier 140 as a prescribed coefficient (ST120→ST130, or ST121→ST130)

Next, the multiplier 140 multiplies the prescribed coefficient provided by the microcomputer 160 and the image signal cumulatively added at the cumulative addition circuit 130 and outputs this to the recording section 150, and the recording section 150 records the image signal outputted from the multiplier 140 on a prescribed recording medium (recording device) (ST131).

When the image signal is recorded in the recording section 150, the microcomputer 160 clears the value of CC, clears the value of TC, and ends processing (ST132→ST133→END).

Figure 6:
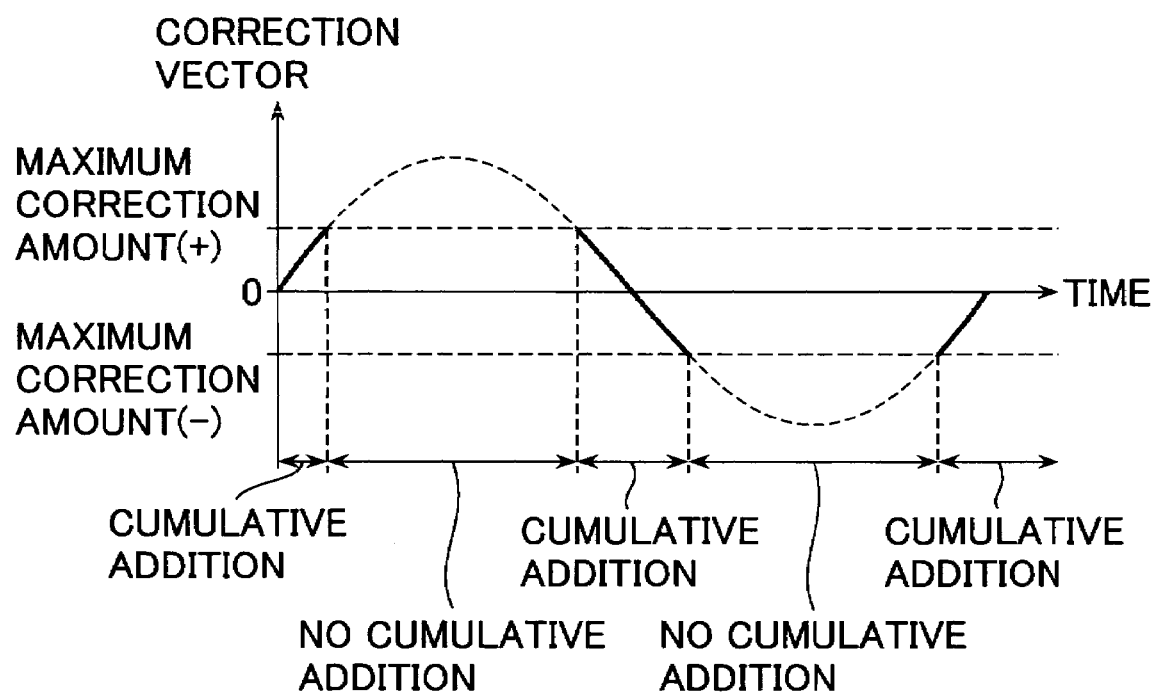
FIG. 6 is a view illustrating the relationship between a correction amount for an image signal and a cumulatively added image signal for the image pickup apparatus shown in FIG. 1.

FIG. 6 is a graph showing an outline of the relationship camera-shake correction amount calculated based on a camera-shake signal and a cumulatively added image signal for an image pickup apparatus operating according to the operation flow of FIG. 5 above.

Figure 7A:
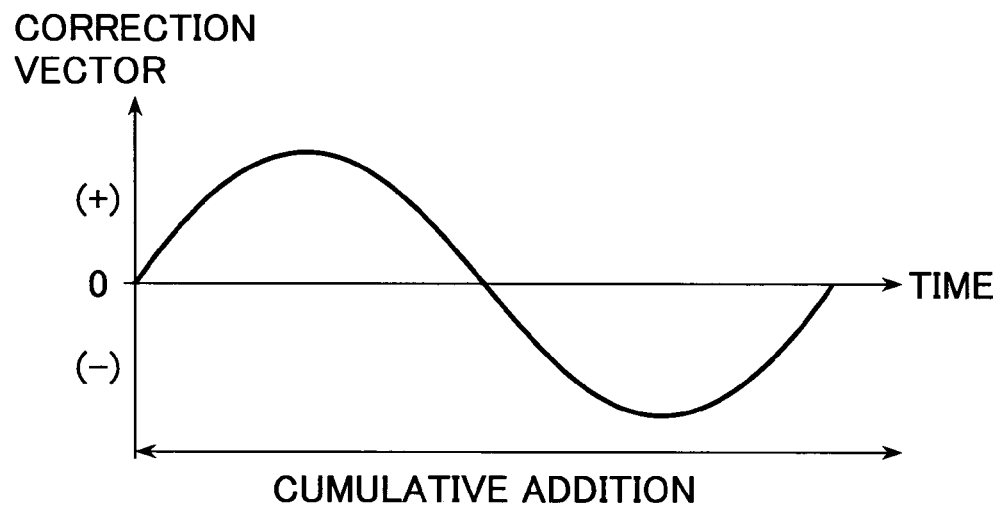
FIG. 7A and 7B are views illustrating the relationship between a correction amount for an image signal and a cumulatively added image signal for the image pickup apparatus of the related art.
Figure 7B:
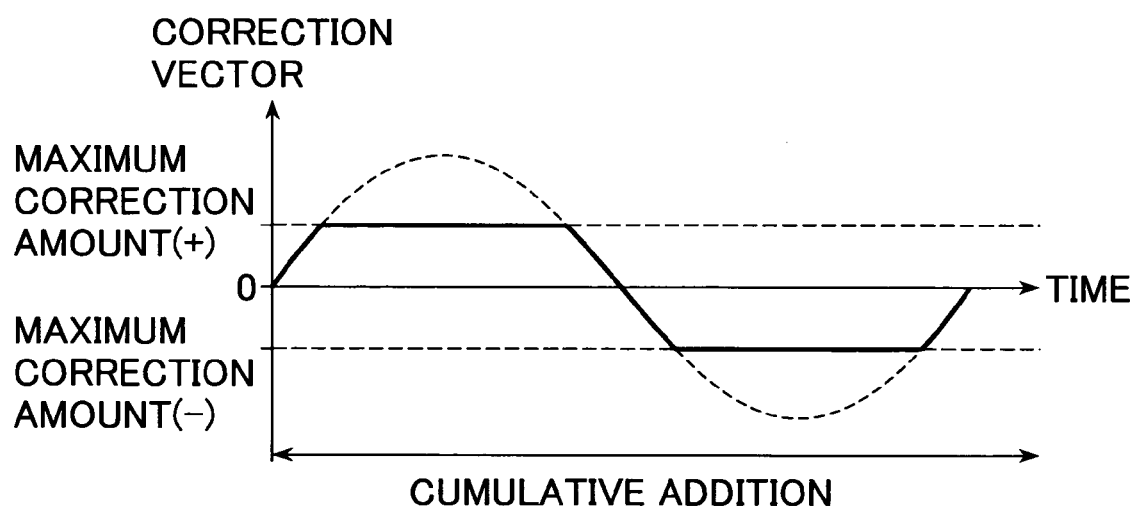

In the graph of FIG. 6, the image signal corrected by a camera-shake correction amount of less than the maximum correction amount corresponds to a solid line, and the image signal corrected by a correction amount greater than or equal to the maximum correction amount corresponds to a dotted line. Image signals corrected at the correction ends, i.e. image signals corrected using a correction amount greater than or equal to the maximum correction amount (the image signal corresponding to the straight line section of FIG. 7B) are not subjected to cumulative addition, and only images signals corrected by less than the maximum correction amount are subjected to cumulative addition and stored in memory.

What is claimed is:

1. An image pickup apparatus comprising:
   an image pickup section having an image pickup element for picking up an image signal;
   camera-shake detection means for detecting a camera-shake amount of said image pickup section and outputting a camera-shake signal according to the detected camera-shake amount;
   camera-shake correction means for correcting said image signal picked up by said image pickup section based on a camera-shake correction amount calculated according to said camera-shake signal outputted by said camera-shake detection means;
   user interface for setting a recording image size as an actual image area which is positioned in a possible image area showing a range for which imaging is possible at said image pickup element of said image pickup section;
   maximum correction amount calculating means for calculating a maximum value for the camera-shake correction amount based on the recording image size set by said user interface and a size of said possible image area;
   means for cumulatively adding the corrected image signal and for storing the same in a memory;
   cumulative addition control means for comparing said camera-shake correction amount calculated by said camera-shake correction means and the maximum value for said camera-shake correction amount calculated by said maximum correction amount calculating means and for subjecting to cumulative addition and storing in the memory the corrected image signal only if the image signal is corrected by less than the maximum correction amount; and
   means for multiplying a coefficient value calculated according to a number of times cumulative addition is performed and the corrected image signal cumulatively added and stored in said memory so as to form a multiplied signal, and for outputting the multiplied signal.

2. A method for correcting an image signal picked up by an image pickup device, said method comprising:
   detecting a camera-shake amount of said image pickup device and outputting a camera-shake signal according to the detected camera-shake amount;
   correcting said image signal picked up by said image pickup section based on a camera-shake correction amount calculated according to said camera-shake signal;
   setting a recording image size as an actual image area which is positioned in a possible image area showing a range for which imaging is possible at an image pickup element of said image pickup section;
   calculating a maximum value for the camera-shake correction amount based on the set recording image size and a size of said possible image area;
   cumulatively adding the corrected image signal and storing the same in a memory;
   comparing the calculated camera-shake correction amount and the calculated maximum value for said camera-shake correction amount and subjecting to cumulative addition and storing in the memory the corrected image signal only if the image signal is corrected by less than the maximum correction amount; and
   multiplying a coefficient value calculated according to a number of times cumulative addition is performed and the corrected image signal cumulatively added and stored in said memory so as to form a multiplied signal, and outputting the multiplied signal.

3. An image pickup apparatus comprising:
   an image pickup section for picking up an image signal;
   means for detecting a camera-shake amount of said image pickup section and for forming a camera-shake signal based on the detected camera-shake amount;
   means for calculating a camera-shake correction amount based on said camera-shake signal and for calculating a maximum camera-shake correction amount;
   means for correcting said image signal picked up by said image pickup section based on the calculated camera-shake correction amount;
   means for comparing the calculated camera-shake correction amount and the calculated maximum camera-shake correction amount, and for cumulatively adding the corrected image signal to a previously corrected image signal or signals only if the calculated camera-shake correction amount used to correct the image signal is less than the calculated maximum camera-shake correction amount; and
   means for multiplying a coefficient value calculated according to a number of times cumulative addition is performed and the cumulatively added corrected image signal so as to form a multiplied signal, and for outputting the multiplied signal.

4. A method for correcting an image signal picked up by an image pickup device, said method comprising:
   detecting a camera-shake amount of said image pickup section and forming a camera-shake signal based on the detected camera-shake amount;
   calculating a camera-shake correction amount based on said camera-shake signal and calculating a maximum camera-shake correction amount;
   correcting said image signal picked up by said image pickup section based on the calculated camera-shake correction amount; and
   comparing the calculated camera-shake correction amount and the calculated maximum camera-shake correction amount, and cumulatively adding the corrected image signal to a previously corrected image signal or signals only if the calculated camera-shake correction amount used to correct the image signal is less than the calculated maximum camera-shake correction amount; and
   multiplying a coefficient value calculated according to a number of times cumulative addition is performed and the cumulatively added corrected image signal so as to form a multiplied signal, and outputting the multiplied signal.

* * * * *